Sept. 24, 1957

J. S. PILCH 2,807,238

HYDRAULIC SYSTEM AND VACUUM ELIMINATING AND
RELIEF VALVE THEREFOR

Filed July 26, 1954

INVENTOR.
JOHN S. PILCH
BY
Raymond A. Paquin
ATTORNEY.

Sept. 24, 1957

J. S. PILCH 2,807,238

HYDRAULIC SYSTEM AND VACUUM ELIMINATING AND
RELIEF VALVE THEREFOR

Filed July 26, 1954

INVENTOR.
JOHN S. PILCH
BY
Raymond A. Taguin
ATTORNEY.

ID PATENT
United States Patent Office 2,807,238
Patented Sept. 24, 1957

2,807,238
HYDRAULIC SYSTEM AND VACUUM ELIMINATING AND RELIEF VALVE THEREFOR

John S. Pilch, Ware, Mass.

Application July 26, 1954, Serial No. 445,758

7 Claims. (Cl. 121—38)

This invention relates to a new and improved valve for hydraulic systems and to hydraulic systems embodying such valves.

An object of the invention is to provide a new and improved combined vacuum eliminator and relief valve for use in hydraulic systems and to hydraulic systems incorporating such a valve.

Another object is to provide a valve of the type set forth which is relatively simple and inexpensive and is fast acting and wherein the time elapsing between partial flow through the valve and full flow is at a minimum.

Another object is to provide a new and improved valve of the type set forth which tends to prevent vacuum forming in the high pressure fluid line.

Another object is to provide a new and improved valve of the type set forth which overcomes the difficulties encountered with prior valves for this purpose, namely, that the partial escaping of fluid created terrific heat and slowed down the operation of the apparatus receiving power from the hydraulic system.

Another object is to provide a new and improved relief valve for a hydraulic system which valve will gradually build up the fluid pressure automatically and which provides a predetermined waiting period before beginning to build up such pressure and which allows the control of the time of waiting and the speed of building up the pressure.

Another object is to provide a valve of the type set forth which has a movable seat which tends to prevent butting or pounding of the piston on the seat and wherein the seat tends to move along with the piston and thereby eliminates wear on the parts and noise of operation.

Another object is to provide a valve which after opening, allows passage of fluid therethrough whereby the friction of the fluid assists in keeping the valve open and thereby also providing a smoother action and more positive opening of the valve and retaining the valve in open position.

Another object is to provide a valve having a small area subject to fluid pressure or in contact with the high pressure line and thereby requiring a much lighter piston actuating spring than otherwise necessary and still have a large area for escape of fluid which provides a less expensive, more trouble free and quieter construction.

Other objects and advantages of the invention will be apparent from the following description taken in connection with the accompanying drawings. It will be understood that changes may be made in the details of construction and arrangement of parts shown and described without departing from the spirit of the invention as set forth in the accompanying claims, as the preferred form has been given by way of illustration only.

Referring to the drawings.

Figure 1:
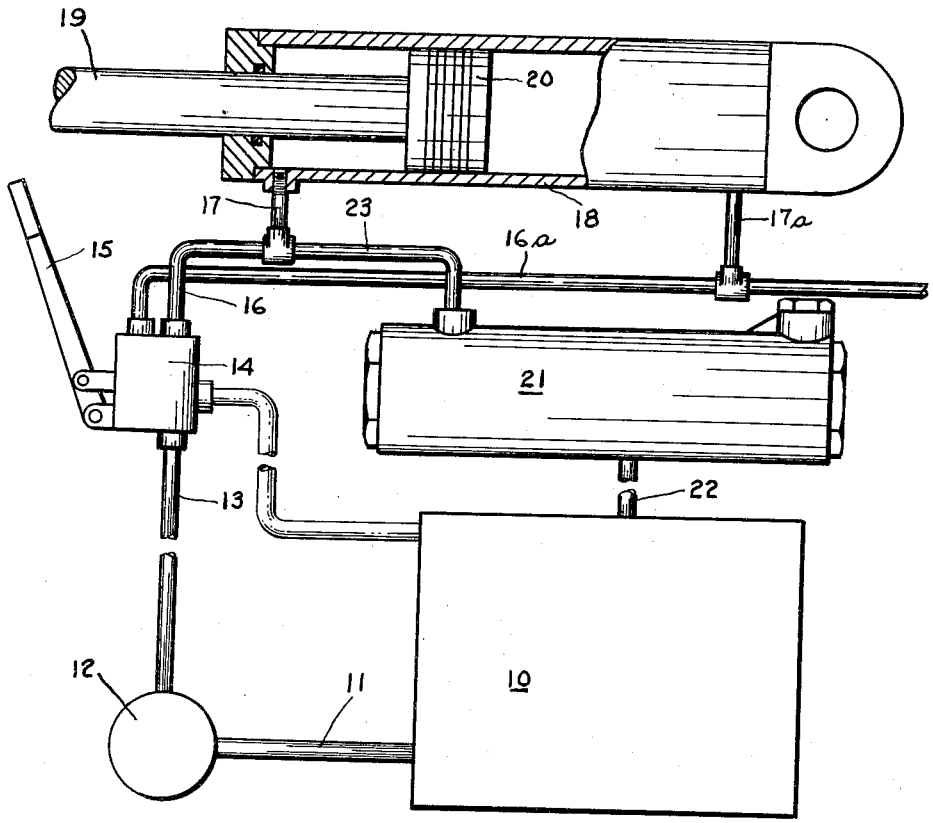
Fig. 1 is a schematic view of a hydraulic system embodying the valve of the invention.

Referring more particularly to the drawings wherein similar reference characters designate corresponding parts throughout, the arrangement shown in Fig. 1 comprises an oil reservoir 10 connected by pipe line 11 to hydraulic pump 12 which in turn is connected by hydraulic line 13 with four way control valve 14 having operating lever 15 for controlling the supply of fluid through hydraulic lines 16 and 16a and fittings 17 and 17a to power cylinder 18 into which extends ram 19 having the double acting piston 20 secured to its end within cylinder 18.

The valve 21, which is a combined vacuum eliminator and relief valve, is connected to the oil reservoir 10 by line 22 and to cylinder 18 through fitting 17 and line 23. A similar valve may be inserted between reservoir 10 and line 16a.

Valve 21 comprises the housing or casing 24 having a bore therethrough with its ends closed by threaded caps 25 and 26 respectively or other suitable means.

Hydraulic line 23 is connected to housing 24 adjacent one end thereof and cap 25, which is at the same end of casing 24, has the guide 26 positioned within slot 27 and on guide 26 is positioned the cap 28 which is retained away from housing cap 25 by means of coil spring 29.

Within casing 24 is provided the sleeve 30 which has one end engaging the shoulder 31 on casing 24 for locating sleeve 30 in fixed position in the casing 24 and at its opposite end sleeve 30 is provided with the spaced grooves or slots 32 as hereinafter described. The sleeve 30 may be provided with a threaded portion 33 adapted to engage a threaded portion 34 on the internal surface of casing 24 for retaining sleeve 30 in position against shoulder 31.

Mounted for sliding movement within sleeve 30 is the annular piston 35 having the tapered or reduced end section 36 adapted to engage cap 28 as hereinafter described and having the peripheral flange 37 which acts as a limit or stop against the end of sleeve 30 which is positioned on flange 31.

Within chamber 38 and engaging the end of annular piston 35 is provided the compression or coil spring 39 which engages piston 35 with one end and has its opposite end engaging flange 40 on engaging member 41 which has the central or axial opening 42 extending into chamber 44 through bore 45 in wall or shoulder 46.

Chamber 38 is connected to hydraulic line 22 through port 47.

In chamber 44 is positioned piston or plunger 48 having the peripheral sealing ring 49 for forming a sealing edge whereby fluid cannot pass directly between the periphery of the piston 48 and the wall of chamber 44.

The port 23a which provides communication between line 23 and the chamber 50 also communicates through a passage 51 and through poppet 52 having the aperture 53 of reduced size therethrough and which poppet 52 is positioned within chamber 54 in which it is retained by cap 55 and chamber 54 communicates through port 56 with chamber 57 between end cap 26 and the adjacent surface of piston 48.

It will be seen that if the spring 39 is pre set for 100 p. s. i., that it requires 100 p. s. i. to move piston 35 away from cap 28 and fluid will then escape through line 22 to the reservoir 10.

It will be seen that when pressure is applied to cap 28, that through slots 32 pressure will be simultaneously applied to tapered shoulder 36 until the cap 28 engages shoulder 30a on sleeve 30 and pressure is maintained on cylinder 35 equal to the pressure setting of the spring 39 while fluid escapes through passage 22.

Fluid of the same pressure simultaneously passes through duct 51 and the predetermined orifice 53 in poppet 52 during the same period and for a short predetermined time of for example two seconds, before piston 48 which immediately begins to move away from cap 26 engages member 41 and when it engages member 41 and the member compresses spring 39 and provides greater pressure to the relief piston or plunger 35 which creates more pressure on the piston gradually, which gradually increases the pressure in line 23.

The time of movement of piston 48 depends on the size of port 53. It also will be seen that piston 35 does not start with a shock or jar but that the pressure on this piston is built up gradually.

It will be seen that as pressure is applied on the top of cap or closure 28 that such cap or closure is tightened on its seat or engagement against the tapered end 36 of piston 35, thus, the difference or time between partial opening or flow and full opening or flow is at a minimum with no large gap between the time that the valve begins to relieve and when it is fully opened, that is, when it starts to open it opens immediately and eliminates any waiting period whereas with prior devices oil partially escaping created terriffic heat and slowed down the operation of the unit.

It is important that port K in piston 35 be large enough to allow free escaping of oil when the piston or plunger is open. It will be seen that with the construction of the present invention that a large, complicated and expensive piston is eliminated but that a relatively small inexpensive piston is employed which has a small area on which pressure may be applied but a much larger area for fluid escape.

It will also be seen that when the cap or closure 28 engages the shoulder 30a on sleeve 30 and piston 35 begins to move away from cap 28 that the frictional drag of fluid on the inner surface of piston 35 helps or tends to speed up the opening, that is, the moving of piston 35 away from closure 28 and helps keep the piston in open position.

It will also be seen that the piston 48 is slow in advancing because of the restriction 53 and requires time for the piston 48 to travel the predetermined distance before it engages member 41. Also, piston 48 can return or retract quickly because the poppet 52 may move out of its pocket or seat, therefore, allowing fluid to pass around poppet 52 as well as through restriction 53 and also that a large orifice 42 is provided in member 41 allowing fluid to pass into chamber 44 which together with spring 58 urges piston 48 toward cap 26.

If desired, shoulder 46 may be formed separately from the casing 24 and mounted for adjustment in the bore as by a threaded connection or this shoulder may be formed on an adjustable sleeve which can be positioned in the bore.

If a shortage of fluid should occur in line 23 and vacuum is being created, fluid will be drawn back by such vacuum from line 22 through opening K in piston 35 and will pull cap or closure 28 away from engagement with piston edge 36 whereby fluid may pass directly to line 23.

Figure 3:
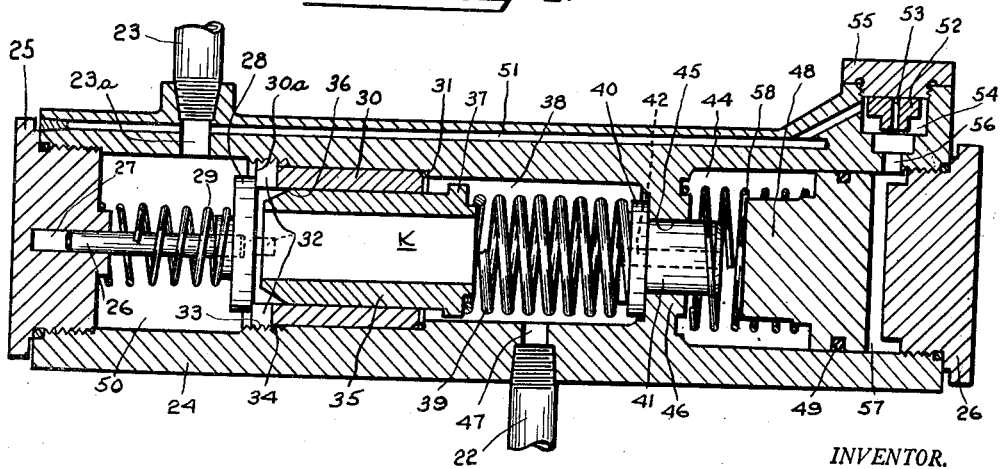
Fig. 3 is a view generally similar to Fig. 2, but showing the valve at a point during its operation.
Figure 2:
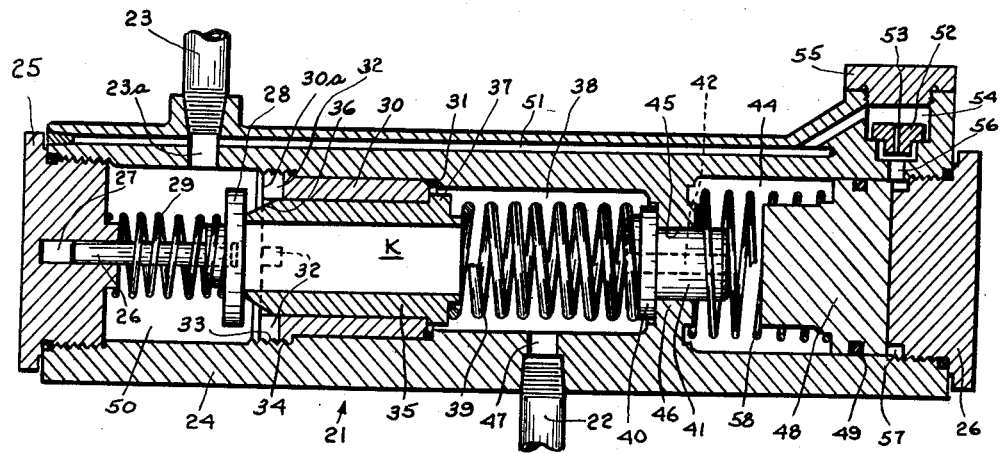
Fig. 2 is a longitudinal sectional view of the valve at the beginning of its cycle.
Figure 4:
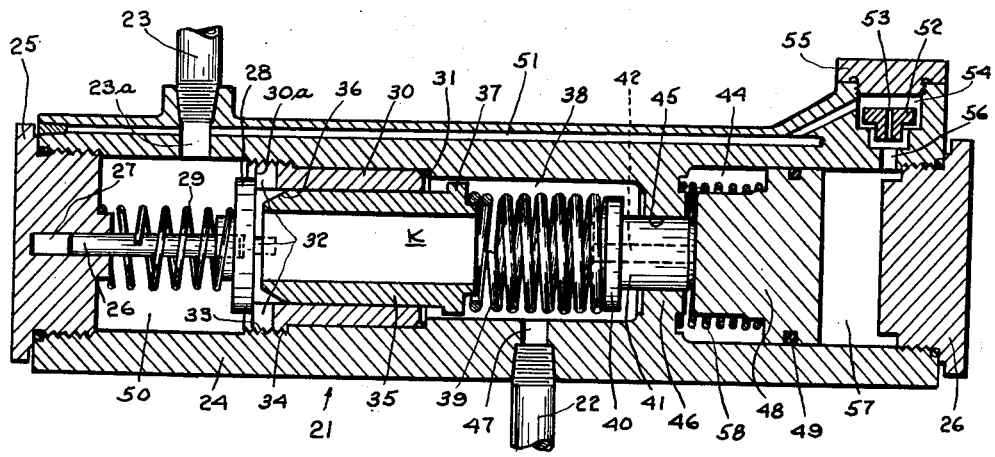
Fig. 4 is a view generally similar to Figs. 2 and 3, but illustrating a further step in the operation of the valve.

In Fig. 2, the valve is shown in the beginning of its cycle when functioning as a relief valve, in Fig. 3, this valve is shown at the beginning of its second cycle and in Fig. 4, it is shown in its third cycle.

It is pointed out that it is possible to make a simplified form of the present invention by eliminating the section of the valve embodying piston 48 and the spring 58 and member 41 and form a simplified or plain relief valve which could be controlled by an adjustable screw control behind spring 39. This would also eliminate port 51 and poppet 52.

It is pointed out that with the present invention a relief valve is provided that will gradually build up the fuel pressure automatically and which provides a predetermined or waiting period before beginning to build up pressure and which also functions as a vacuum eliminator to eliminate vacuum in the hydraulic lines and speed up operation of the hydraulic system.

It is further pointed out that by providing the movable seat which tends to prevent hitting or pounding of the piston on its seat as would occur with a solid seat, this seat tends to move along with the piston and thereby eliminates wear on the parts and noise of operation.

Also, by providing the valve piston with a small area subject to fluid pressure or in contact with the high pressure line, it requires a much lighter piston actuating spring than otherwise necessary and still have a large area or opening for escape of fluid. The smaller spring is less expensive and more trouble free and less breakage is experienced. Also, it lessens the hammering or pounding of the valve on its seat.

From the foregoing, it will be seen that I have provided new and improved means for obtaining all of the objects and advantages of the invention.

I claim:

1. In a device of the character described, a casing having a longitudinal bore, hydraulic lines connected to said casing and communicating with said bore at spaced points, flow control means in said bore in the fluid path between said spaced points and comprising an annular piston mounted for sliding movement in said bore, resilient means for urging said piston in one direction, a resiliently urged cap member adapted to engage one end of said annular piston, said end of said annular piston adapted to engage said cap member being of reduced cross section and stop means for limiting the movement of said cap member toward said annular piston, a second piston in said bore in aligned spaced relation with said annular piston, an engaging member between said annular piston and said second piston and engaging said resilient means for urging said annular piston in one direction and a separate fluid passage allowing the passage of fluid to said bore behind said second piston for urging said second piston into engagement with said engaging member to increase the fluid pressure necessary to actuate said annular piston.

2. In a device of the character described, a casing having a longitudinal bore, hydraulic lines connected to said casing and communicating with said bore at spaced points, flow control means in said bore in the fluid path between said spaced points and comprising an annular piston mounted for sliding movement in said bore, resilient means for urging said piston in one direction, a resiliently urged cap member adapted to engage one end of said annular piston, said end of said annular piston adapted to engage said cap member being of reduced cross section and stop means for limiting the movement of said cap member toward said annular piston, a second piston in said bore in aligned spaced relation with said annular piston, an engaging member between said annular piston and said second piston and a separate fluid passage allowing the passage of fluid to said bore behind said second piston for urging said second piston into engagement with said engaging member to increase the fluid pressure necessary to actuate said annular piston and a poppet in said separate fluid passage.

3. In a device of the character described, a casing having a longitudinal bore, hydraulic lines connected to said casing and communicating with said bore at spaced points, flow control means in said bore in the fluid path between said spaced points and comprising an annular piston mounted for sliding movement in said bore, resilient means for urging said piston in one direction, a cap member adapted to engage one end of said annular piston, said end of said annular piston adapted to engage said cap member being of reduced cross section and stop means for limiting the movement of said cap member toward said annular piston, and spring means urging said cap member toward said annular piston and said annular piston toward said cap member, a second piston in said bore in aligned spaced relation with said annular piston, an engaging member between said annular piston and said second piston and engaging said resilient means for urging said annular piston in one direction and a separate fluid passage allowing the passage of fluid to said bore behind said second piston.

4. In a device of the character described, a casing having a longitudinal bore, hydraulic lines connected to said casing and communicating with said bore at spaced points, flow control means in said bore in the fluid path between said spaced points and comprising an annular piston mounted for sliding movement in said bore, resilient means for urging said piston in one direction, a resiliently urged cap member adapted to engage one end of said annular piston, said end of said annular piston adapted to engage said cap member being of reduced cross section and stop means for limiting the movement of said cap member to said annular piston, and spring means urging said cap member toward said annular piston and said annular piston toward said cap member, a second piston in said bore in aligned spaced relation with said annular piston, an engaging member between said annular piston and said second piston and a separate fluid passage allowing the passage of fluid to said bore behind said second piston and a poppet in said separate fluid passage.

5. A hydraulic system comprising a cylinder, a piston in said cylinder, an oil reservoir, means supplying fluid under pressure from said oil reservoir to said cylinder, a second hydraulic line connecting said cylinder with said oil reservoir, a valve interposed in said second line, said valve comprising a casing having a longitudinal bore, hydraulic lines connected to said casing and communicating with said bore at spaced points, flow control means in said bore in the fluid path between said spaced points and comprising an annular piston mounted for sliding movement in said bore, resilient means for urging said piston in one direction, a cap member adapted to engage one end of said annular piston, said end of said annular piston adapted to engage said cap member being of reduced cross section and stop means for limiting the movement of said cap member to said annular piston, a second piston in said bore in aligned spaced relation with said annular piston, an engaging member between said annular piston and said second piston and a separate fluid passage allowing the passage of fluid to said bore behind said second piston.

6. A hydraulic system comprising a cylinder, a piston in said cylinder, an oil reservoir, means supplying fluid under pressure from said oil reservoir to said cylinder, a second hydraulic line connecting said cylinder with said oil reservoir, a valve interposed in said second line, said valve comprising a casing having a longitudinal bore, hydraulic lines connected to said casing and communicating with said bore at spaced points, flow control means in said bore in the fluid path between said spaced points and comprising an annular piston mounted for sliding movement in said bore, resilient means for urging said piston in one direction, a resiliently urged cap member adapted to engage one end of said annular piston, said end of said annular piston adapted to engage said cap member being of reduced cross section and stop means for limiting the movement of said cap member to said annular piston, a second piston in said bore in aligned spaced relation with said annular piston, an engaging member between said annular piston and said second piston and a separate fluid passage allowing the passage of fluid to said bore behind said second piston and a poppet in said separate fluid passage.

7. In a device of the character described, a casing having a fluid passage, an annular piston in said passage, a cap adjacent one end of said annular piston, said end of said annular piston adjacent said cap having a tapered surface, said surface tapering inwardly toward said cap and spring means urging said cap toward said annular piston and said annular piston toward said cap, a second piston in said bore in aligned spaced relation with said annular piston, an engaging member between said annular piston and said second piston and a separate fluid path allowing the passage of fluid to said bore behind said second piston.

References Cited in the file of this patent
UNITED STATES PATENTS

| | | |
|---|---|---|
| 708,332 | Ennor | Sept. 2, 1902 |
| 1,687,047 | Trail | Oct. 9, 1928 |
| 2,191,792 | Hill | Feb. 27, 1940 |
| 2,347,837 | Morrison | May 2, 1944 |
| 2,451,586 | Strid | Oct. 19, 1948 |
| 2,633,148 | Kelly | Mar. 31, 1953 |